(12) United States Patent
Ranini et al.

(10) Patent No.: US 8,091,340 B2
(45) Date of Patent: Jan. 10, 2012

(54) METHOD OF CONTROLLING THE INTAKE OF AN INTERNAL-COMBUSTION ENGINE, NOTABLY OF GASOLINE OR DIESEL TYPE, AND ENGINES USING SAME

(75) Inventors: Alain Ranini, Rueil Malmaison (FR);
Sébastien Potteau, Triel sur Seine (FR)

(73) Assignee: Institut Francais du Petrole, Cedex (FR)

( * ) Notice: Subject to any disclaimer, the term of this patent is extended or adjusted under 35 U.S.C. 154(b) by 0 days.

(21) Appl. No.: 11/564,457

(22) Filed: Nov. 29, 2006

(65) Prior Publication Data
US 2007/0157603 A1 Jul. 12, 2007

(30) Foreign Application Priority Data
Nov. 30, 2005 (FR) ..................................... 05 12286

(51) Int. Cl.
*F01N 3/00* (2006.01)
(52) U.S. Cl. ................. 60/285; 60/274; 60/284; 60/299
(58) Field of Classification Search .................... 60/274, 60/284, 285, 299; 123/198 F, 481
See application file for complete search history.

(56) References Cited

U.S. PATENT DOCUMENTS

| | | | |
|---|---|---|---|
| 4,395,875 A * | 8/1983 | Virk ................................ | 60/274 |
| 4,467,602 A | 8/1984 | Iizuka et al. | |
| 6,023,929 A * | 2/2000 | Ma .................................. | 60/295 |
| 6,415,601 B1 * | 7/2002 | Glugla et al. .................... | 60/284 |
| 6,739,123 B2 * | 5/2004 | Glugla et al. .................... | 60/284 |
| 6,823,657 B1 * | 11/2004 | Waschatz et al. ................ | 60/274 |
| 6,857,264 B2 * | 2/2005 | Ament ............................. | 60/284 |
| 6,904,752 B2 * | 6/2005 | Foster et al. .................... | 60/285 |
| 6,907,725 B2 * | 6/2005 | Szymkowicz et al. .......... | 60/285 |
| 2002/0069638 A1 | 6/2002 | Glugla et al. | |

FOREIGN PATENT DOCUMENTS
DE 19812829 10/1998
* cited by examiner

*Primary Examiner* — Thomas Denion
*Assistant Examiner* — Diem Tran
(74) *Attorney, Agent, or Firm* — Antonelli, Terry, Stout & Kraus, LLP.

(57) ABSTRACT

The present invention relates to a method of controlling the intake of an internal-combustion engine comprising at least two groups (12, 14) of at least one cylinder (C1-C4) wherein a feed is admitted for operation of said engine, and an exhaust line (40, 94, 100) comprising at least one exhaust gas depollution means (42, 96, 102).

According to the invention, the method consists, while the engine runs at low speeds and/or at low torques, in evaluating the total feed to be admitted into the cylinders to operate the engine, in admitting a greater proportion of the total feed into one (12) of the groups of cylinders (C1, C4) than in the other (14) group of cylinders (C2, C3) so as to achieve an exhaust gas temperature increase allowing to speed up the rise in temperature of depollution means (42, 96, 102).

9 Claims, 2 Drawing Sheets

METHOD OF CONTROLLING THE INTAKE OF AN INTERNAL-COMBUSTION ENGINE, NOTABLY OF GASOLINE OR DIESEL TYPE, AND ENGINES USING SAME

FIELD OF THE INVENTION

The present invention relates to a method of controlling the intake of an internal-combustion engine, notably of gasoline or diesel type, and to engines using such a method.

BACKGROUND OF THE INVENTION

Generally, in this type of engine, the exhaust gas is discharged into the atmosphere through an exhaust line bearing a means for depolluting this exhaust gas before it is discharged into the atmosphere.

Advantageously, this depollution means is a catalyst through which this gas flows, and which is intended to remove some pollutants contained therein. The main function of the catalyst, more particularly a so-called "three-way" catalyst, is to oxidize the unburnt hydrocarbons (HC) and the carbon monoxide (CO), and to reduce the nitrogen oxides ($NO_x$), which are the pollutants that are usually present in the exhaust gas.

It is common knowledge that this type of catalyst can only fill its role when it has reached a minimum temperature of operation start or initiation, referred to as light-off (of the order of 200° C.). This temperature level is essential to allow reaction between the catalytic elements borne by the catalyst and the pollutants contained in the exhaust gas. However, notably during the engine cold running period that follows start-up of this engine, the rise in temperature of the catalyst is not fast enough, which causes discharge of the unprocessed exhaust gas into the atmosphere. An increase in the temperature rise speed of this catalyst is consequently necessary to provide exhaust gas depollution and thus to meet the standards applied to motor vehicle engines that are increasingly severe. This problem also arises when the engine is warm with a warm catalyst (at operating temperature) and when this engine runs at low speeds and/or low torques, such as at idle speed. In such configurations, the exhaust gas discharged from the engine is at such a temperature (below 200° C.) that it cannot keep the catalyst temperature high enough for it to be efficient and on the contrary cools it down by flowing therethrough.

Many solutions have been provided to this problem in order to rapidly increase the catalyst temperature. These solutions essentially consist in increasing the exhaust gas temperature by either raising, for a short time, the fuel/air ratio of the fuel mixture present in the cylinders by creating an air deficit in the case of a diesel engine or, in the case of a gasoline engine, by injecting more fuel into the cylinders with delayed combustions and by injecting in parallel air into the exhaust line so as to create afterburning of the exhaust gas upstream from the catalyst.

The major drawback of such solutions is to raise very significantly the fuel consumption and to be detrimental to the driving comfort. Furthermore, the fuel/air ratio increase or the exhaust gas afterburning causes an increase in the discharge of pollutants that will not be treated by the catalyst.

The present invention aims to overcome the aforementioned drawbacks by means of an engine intake control method that allows to rapidly raise the exhaust gas temperature while shortening the time required for initiation of the catalyst, and while minimizing the fuel overconsumption and reducing the discharge of pollutants that are produced and not treated during the catalyst temperature rise up to the light-off thereof.

SUMMARY OF THE INVENTION

The invention therefore relates to a method of controlling the intake of an internal-combustion engine comprising at least two groups of at least one cylinder wherein a feed is admitted for operation of said engine, and an exhaust line comprising at least one exhaust gas depollution means, characterized in that it consists, while the engine runs at low speeds and/or at low torques:

in evaluating the total feed to be admitted into the cylinders to operate the engine, in admitting a greater proportion of the total feed into one of the groups of cylinders than in the other group of cylinders so as to achieve an exhaust gas temperature increase allowing to speed up the rise in temperature of the depollution means.

This method can consist in admitting at most all of the total feed into one of the groups of cylinders.

It can also consist in admitting into one of the groups of cylinders a proportion of substantially 75% of the total feed and in admitting into the other group of cylinders the rest of the total feed.

The feed can consist of the amount of fuel to be injected into the cylinders.

The feed can also consist of the amount of fuel mixture to be fed into the cylinders.

The method can consist in switching the intake of the greatest proportion of the total feed between the at least two groups of cylinders.

The method can consist in increasing the combustion underadvance of the cylinders of the group of cylinders with the greatest proportion of total feed.

BRIEF DESCRIPTION OF THE FIGURES

Other features and advantages of the invention will be clear from reading the description hereafter, given by way of non limitative example, with reference to the accompanying figures wherein.

DETAILED DESCRIPTION

Figure 1:
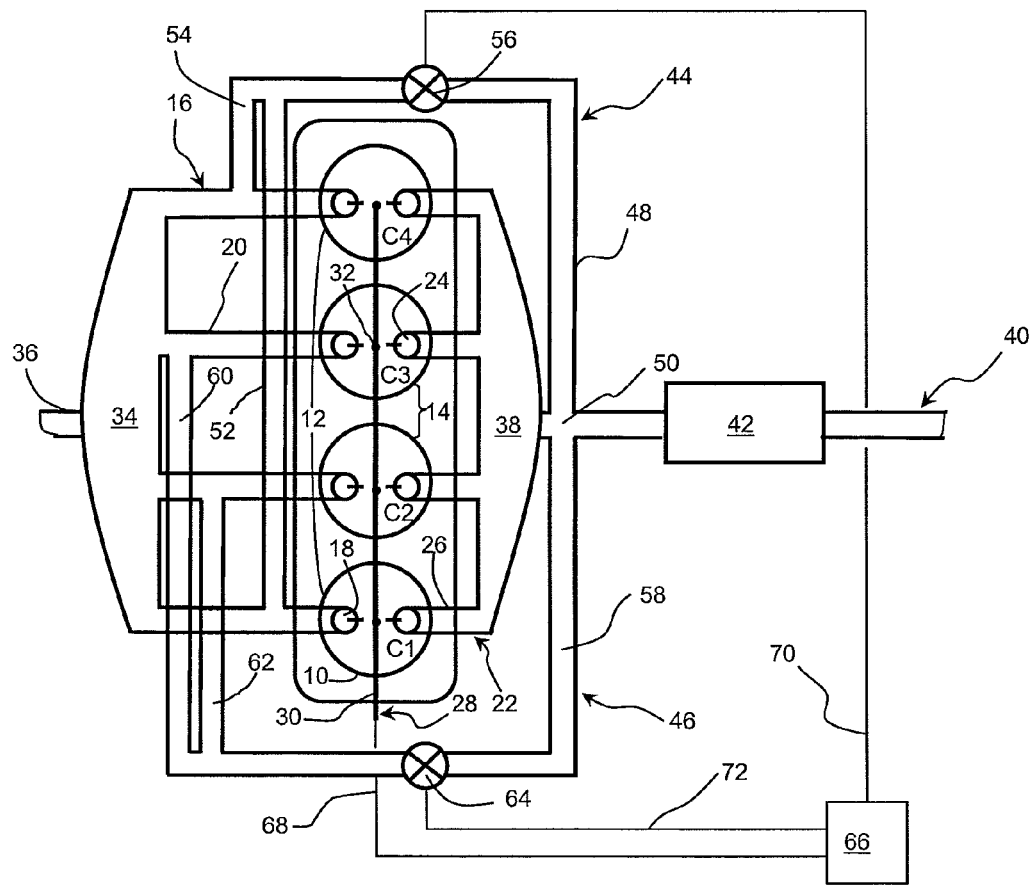
FIG. 1 diagrammatically shows an internal-combustion engine using the method according to the invention, FIG. 2 diagrammatically shows an internal-combustion engine variant using the method according to the invention.

FIG. 1 shows an example of an internal-combustion engine of direct fuel injection type, in particular a diesel engine, using the method according to the invention.

This engine comprises at least two cylinders or at least two groups of at least one cylinder wherein combustion of the fuel mixture takes place. In the example of FIG. 1, the engine comprises four cylinders 10 numbered from C1 to C4 from the bottom of FIG. 1, for better understanding of the description hereafter. The engine of this FIG. 1 works according to the ignition cycle referred to as 1, 3, 4, 2, which is known to the man skilled in the art. These cylinders are divided up into two groups 12, 14 of two cylinders with, for group 12, cylinders C1 and C4 and, for group 14, cylinders C3 and C2. This example does not rule out all the other configurations, such as two groups with a group of three cylinders C1, C4, C3 and a group of one cylinder C2, or any configurations depending on the ignition cycle.

Each cylinder comprises at least one intake means 16 with an intake valve 18 and an intake pipe 20, at least one exhaust means 22 with an exhaust valve 24 and an exhaust pipe 26, and a fuel injection means 28 such as an injection ramp 30 bearing injection nozzles 32 allowing fuel to be directly fed into the cylinders. Pipes 20 of intake means 16 are connected to an intake manifold 34 into which ambient air or supercharged air is fed through a line 36. Pipes 26 of exhaust means 22 open onto an exhaust manifold 38 that is associated with an exhaust line 40. This exhaust line bears depollution means 42 intended for the exhaust gas circulating in this line and more particularly, but not exclusively, an oxidation catalyst in the case of the diesel engine as illustrated in FIG. 1.

This engine optionally comprises exhaust gas recirculation means referred to as EGR, allowing the burnt exhaust gas to be fed into the cylinders again. This recirculation allows to control combustion of the fuel with the fluid(s) present therein.

More particularly, reintroduction of this exhaust gas allows the amount of oxygen present in these cylinders to be measured out to provide combustion with the fuel injected.

In the case of the example described, this EGR consists of two distinct EGR circuits 44 and 46. Circuit 44 comprises an exhaust gas recirculation pipe 48 that starts at exhaust line 40 at a point 50 located downstream from exhaust manifold 38 and upstream from catalyst 42. This pipe divides, in the vicinity of the intake manifold, into two branch lines that open onto the same group of cylinders. More precisely, for group 12, a branch line 52 opens onto intake pipe 20 of cylinder C1 and another branch line 54 opens onto the intake pipe of cylinder C4. This circuit also comprises a valve 56, referred to as EGR valve, located between point 50 and branch lines 52, 54, and which allows to control the amount of exhaust gas circulating in pipe 48. EGR circuit 46 also comprises an exhaust gas recirculation pipe 58 that starts at point 50 and divides, in the vicinity of the intake manifold, into two branch lines 60, 62. These branch lines open onto group 14 of cylinders and more precisely onto intake pipe 20 of cylinder C2 and of cylinder C3. Similarly, pipe 58 bears an EGR valve 64 with the same configuration as valve 56.

As it is known per se, an engine control unit 66 such as an engine computer controls running of the engine. This unit contains mappings or data tables allowing to evaluate, according to the engine running conditions, such as the engine speed, the parameters required for its operation. This computer also allows to control the components of this engine, such as fuel injection means 28, through a control line 68 and valves 56 and 64 through a control line 70, 72.

During engine running, the engine computer determines whether this engine runs under cold operation conditions or if the engine is hot but runs at low speeds and/or low torques, notably by means of the temperature detector this engine is usually equipped with.

In these cases, the distribution of the total feed is to be asymmetrized between the two groups of cylinders. More particularly, one of the groups of cylinders receives a larger amount of feed than the other, without the overall amount of engine feed being changed. By way of example, one of the groups receives 75% of the initial total feed and the other one of the groups receives the rest of this feed, i.e. 25%. Of course, this asymmetry can be even greater, including operation stop of a group of cylinders by admitting no feed. In this case, the intake and exhaust valves of this cylinder remain activated so as to use the gas transfer work through these valves. This allows to increase the feed supplied to the group of cylinders in operation and thus to contribute to the exhaust gas temperature increase.

To achieve this asymmetry, the computer contains in its memory or in its tables an evaluation of the overall amount of fuel that has to be injected into the four cylinders during the cold operation phase.

Instead of injecting the same proportion of the overall amount of fuel into each cylinder, as it is done according to the method of the prior art, this computer controls injection nozzles 32 in such a way that the fuel distribution occurs dissymmetrically for each group of cylinders. Thus, by way of example, one of the groups of cylinders, for example group 12 with cylinders C1 and C4, receives a greater proportion of the overall amount of fuel than the other group with cylinders C2 and C3.

Considering the large amount of fuel injected into cylinders C1 and C4, the combustion that takes place in these cylinders is more considerable than that in cylinders C2 and C3, and it generates exhaust gas at higher temperature than the usual running conditions of this engine. This high-temperature gas is discharged from cylinders C1, C4 upon opening of exhaust valves 24 and it mixes with the exhaust gas from cylinders C2 and C3. This mixing allows to obtain exhaust gas in manifold 38 at a higher temperature than the exhaust gas temperature commonly obtained in this manifold by means of the method according to the prior art. The gas is then discharged from this manifold and flows through catalyst 42 while raising more rapidly the temperature of the body thereof so that it reaches its light-off.

In order to prevent too great a temperature gradient in the engine between the two groups of cylinders, a switch between the groups of cylinders is to be performed. Thus, the computer controls injection nozzles 32 so as to switch the groups of cylinders after a certain time of operation, every 10 second for example. When this switch is performed, group 14 of cylinders C2 and C3 receives the greater proportion of fuel and group 12 of cylinders C1 and C4 receives the smaller proportion.

Furthermore, in order to control the combustion in the cylinders of each group of cylinders, valves 56 and 64 are to be controlled in such a way that a large amount of EGR is sent into the cylinders containing a great proportion of feed and, conversely, a small amount of EGR is sent to the group of cylinders with a small proportion of feed.

Besides, it is possible to increase still further the exhaust temperatures by subtiming even more the cylinders that receive the greatest proportion by means of a combustion underadvance of the cylinders laden with feed. In fact, the working stability of a cylinder is all the lower for a given subtiming since the cylinder contains feed. Advantageously, the underadvance can be all the greater since the proportion of feed in the cylinder is great.

As soon as the catalyst has reached its operating temperature, computer 66 controls the various components of the engine so as to distribute the feed identically in each cylinder.

During a testing survey, the applicant carried out many tests of the method according to the invention whose results can be seen in FIGS. 3 to 6. These tests consisted in using a diesel engine at low speed (approximately 1500 rpm) with a low MEP, of the order of 0.5 bar, and in performing cold operation thereof according to the method of the invention and according to the method of the prior art.

Figure 3:
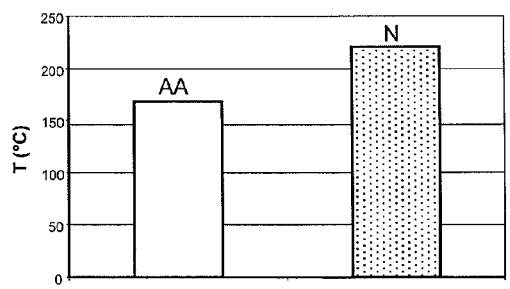
FIGS. 3 to 6 are graphs showing, in relation to the state of the art, the exhaust gas temperature increase (FIG. 3), the decrease in the unburnt hydrocarbons emissions (FIG. 4), in the carbon monoxide emissions (FIG. 5) and in the combustion noise (FIG. 6) as a result of the implementation of the method according to the invention.
Figure 4:
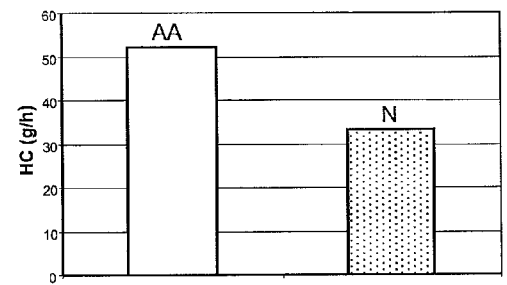
Figure 5:
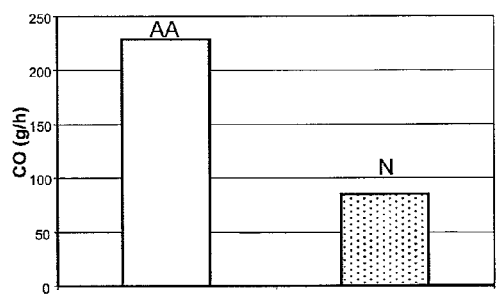
Figure 6:
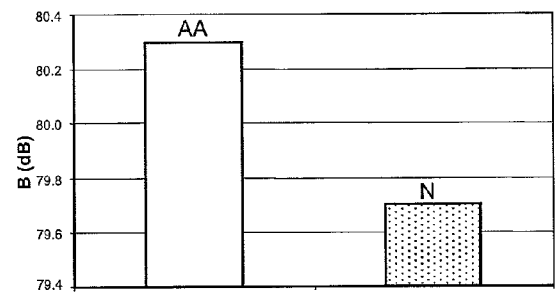

FIG. 3 shows, for cold operation, the exhaust gas temperature (T in Celsius degrees) of an engine running according to the method of the prior art (AA) with a feed evenly distributed among the cylinders and that of an engine running according to the method of the invention (N). It can be observed that this temperature T increases by about 50° C. between the exhaust gas temperature of the engine using the method according to the prior art and that of the engine using the method according to the invention. Advantageously, for the engine using the method according to the invention, emissions are greatly reduced, by about 36% for the unburnt hydrocarbons HC (FIG. 4 with HC in grams per hour) and by about 62% for the carbon monoxide CO (FIG. 5 with CO in grams per hour). Similarly, the combustion noise B (FIG. 6 with B in decibel) is reduced by about 0.6 dB in relation to the method of the prior art.

Thus, by means of the invention, the exhaust gas temperature is not only considerably increased, thus promoting fast catalyst operation start, but the pollutants are also greatly reduced as a result of the high combustion temperature.

Figure 2:
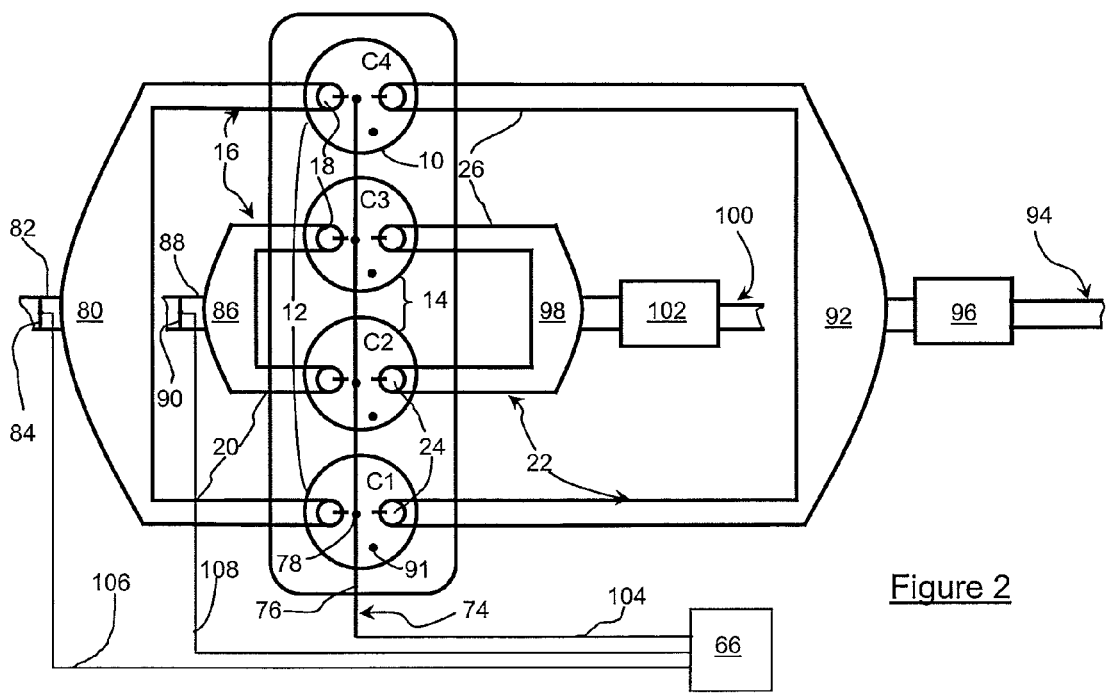

FIG. 2 shows a variant of FIG. 1 with a use of the method according to the invention in connection with a gasoline type direct-injection internal-combustion engine generally running under stoichiometric conditions.

Of course, the present invention can also apply to a sequential-injection gasoline type internal-combustion engine with at least one fuel injection nozzle per intake pipe allowing to achieve indirect injection of the fuel.

For simplification reasons, the example of FIG. 2 comprises the same reference numbers for the elements common to the two figures.

This engine also comprises two groups 12, 14 of two cylinders, C1 and C4 for group 12 and C2 and C3 for group 14. Each cylinder comprises at least one intake means 16 with an intake valve 18 and an intake pipe 20, at least one exhaust means 22 with an exhaust valve 24 and an exhaust pipe 26, and an indirect fuel injection means 74, for example an injection ramp 76 with injection nozzles 78 feeding fuel into the cylinders to make a fuel mixture therein. Pipes 20 of group 12 of cylinders C1 and C4 are connected to an intake manifold 80 into which intake air (ambient air or supercharged air) is fed through a line 82 whose cross section of flow is controlled by a shutoff means such as a butterfly shutter 84. Pipes 20 of group 14 of cylinders C2 and C3 are also connected to another intake manifold 86 into which intake air is fed through a line 88 controlled by a butterfly shutter 90. The cylinders comprise, as it is known per se, a means for igniting the fuel mixture, such as a spark plug 91.

Symmetrically to the intake pipes, exhaust pipes 26 of group 12 of cylinders C1 and C4 are connected to an exhaust manifold 92 from which starts an exhaust line 94 bearing an exhaust gas depollution means such as a three-way catalyst 96. Similarly, exhaust pipes 26 of group 14 of cylinders C2 and C3 are connected to an exhaust manifold 98 with an exhaust line 100 and a depollution means 102 such as a three-way catalyst. Advantageously, lines 94 and 100 can meet downstream from catalysts 96 and 102 so as to form a single exhaust line (not shown).

The engine also comprises an engine computer 66 allowing to control operation of the engine. This computer notably allows to control injection nozzles 78 through a control line 104 and butterfly shutters 84, 90 through a control line 106 and 108, as well as spark plugs 91 through a control line (not shown).

As for the operation of the engine of FIG. 1, asymmetrization of the feed distribution is performed to increase the exhaust gas temperature for cold or hot operation of the engine at low speeds and/or low torques.

To achieve this asymmetry, the computer evaluates the total feed that has to be injected into the four cylinders during the conventional cold operation phase, which corresponds to the total amount of fuel mixture (air or supercharged air with fuel) to be fed into the cylinders. From this evaluation, the computer controls injection nozzles 78 and butterfly shutters 84, 90 so that the fuel mixture distribution occurs in such a way that an amount of fuel mixture is greater in one group of cylinders, for example group 12 with cylinders C1 and C4, than in the other group 14 with cylinders C2 and C3.

Thanks to a larger amount of fuel mixture in cylinders C1 and C4, the combustion that takes place therein, after control of spark plug 91 by the computer, generates a higher combustion temperature than in cylinders C2 and C3. The exhaust gas produced by this combustion is therefore at a higher temperature than under convention cold operation conditions of this engine. The gas is then discharged, upon opening of exhaust valves 24, into exhaust manifold 92, which it leaves to flow through catalyst 96, thus allowing the temperature thereof to be raised.

In order to also prevent high temperature gradients in the engine, computer 66 controls injection nozzles 78 and butterfly shutters 84, 90 so as to switch the proportions of the feed in the groups of cylinders after a certain time of operation, every 10 second for example. Thus, after this switch, group 14 of cylinders C2 and C3 receives the larger amount of fuel mixture and group 12 of cylinders C1 and C4 receives the smaller amount.

Similarly, as mentioned above in connection with FIG. 1, it is possible to provide subtiming of the cylinders with the greatest amount of feed by means of a combustion underadvance of these cylinders so as to increase even further the exhaust temperatures.

Of course, all the strategies can be considered for raising the temperature of the catalysts. It is notably possible to perform asymmetrization of the feed for one of the groups of cylinders until the catalyst concerned has reached its operation initiation temperature, then to switch this asymmetrization to the other group of cylinders to raise the temperature in the other catalyst up to the operating temperature thereof.

As soon as the catalysts have reached their operating temperature, computer 66 controls injection nozzles 78 and butterfly shutters 84, 90 so that the feed is evenly distributed in the groups of cylinders and, consequently, in each cylinder.

The present invention is not limited to the embodiment examples described above and it encompasses any variant or equivalent.

The invention claimed is:

1. A method of controlling the intake of an internal-combustion engine comprising at least two groups of at least one cylinder wherein a feed is admitted for operation of said engine, and an exhaust line comprising at least one exhaust pas depollution means, the method comprising, while the engine runs at least one of low speeds and low torques:
   evaluating the total feed to be admitted into the cylinders to operate the engine,
   admitting a greater amount of the total feed into one of the groups of cylinders than in the other group of cylinders so as to achieve an exhaust gas temperature increase allowing to speed up the rise in temperature of the depollution means,
   maintaining the intake and exhaust valves of the other group of cylinders active and admitting a smaller amount of the total feed into the other group of cylinders while the engine runs at least one of low speeds and low torques, and as soon as the at least one exhaust gas depollution means has reached its operating temperature, distributing the feed identically into each cylinder.

2. A method of controlling the intake of an internal-combustion engine as claimed in claim 1, wherein a proportion of substantially 75% of the total feed is admitted into one of the groups of cylinders and the rest of the total feed is admitted into the other group of cylinders while the engine runs at least one of low speeds and low torques.

3. A method of controlling the intake of an internal-combustion engine as claimed in claim 1, wherein the feed consists of the amount of fuel to be injected into the cylinders.

4. A method of controlling the intake of an internal-combustion engine as claimed in claim 1, further comprising switching the intake of the greatest proportion of the total feed between the at least two groups of cylinders.

5. A method of controlling the intake of an internal-combustion engine according to claim 1, further comprising increasing the combustion underadvance of the cylinders of the group of cylinders with the greatest proportion of total feed.

6. A method of controlling the intake of an internal-combustion engine according to claim 1, wherein the internal-combustion engine is a gasoline direct-injection internal-combustion engine and wherein the method comprises running all of the cylinders generally under stoichiometric conditions.

7. A method of controlling the intake of an internal-combustion engine according to claim 1, wherein at least one exhaust gas depollution means comprises a three-way catalyst.

8. A method of controlling the intake of an internal-combustion engine according to claim 1, wherein an exhaust gas depollution means is provided for each of the at least two groups of cylinders.

9. A method of controlling the intake of an internal-combustion engine as claimed in claim 8, further comprising switching the intake of the greatest proportion of the total feed between the at least two groups of cylinders.

* * * * *